Aug. 11, 1964   W. M. BROWN ETAL   3,143,823
FISHING ROD AND REEL ATTACHMENT
Filed May 16, 1962   2 Sheets-Sheet 1
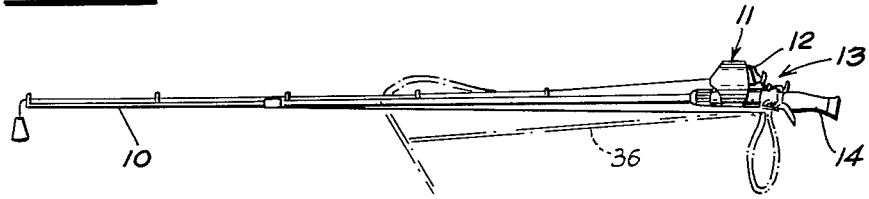
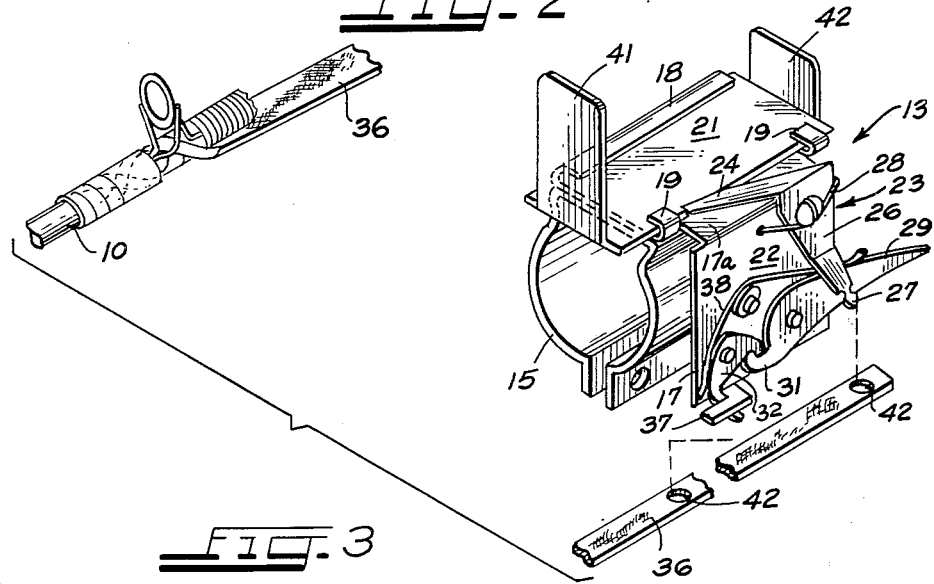
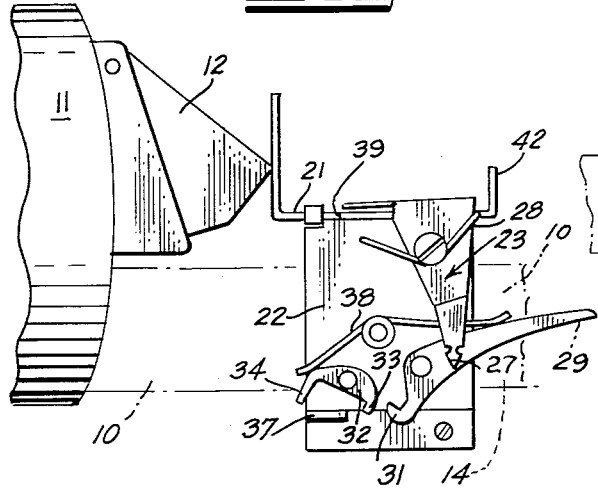
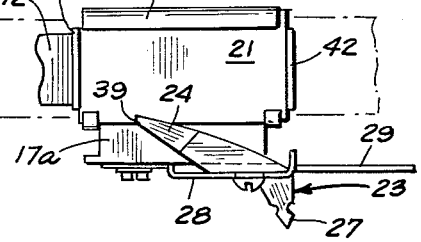
INVENTORS
WALTER M. BROWN
SAM TROMBATORE
BRUNO BROWN
BY.

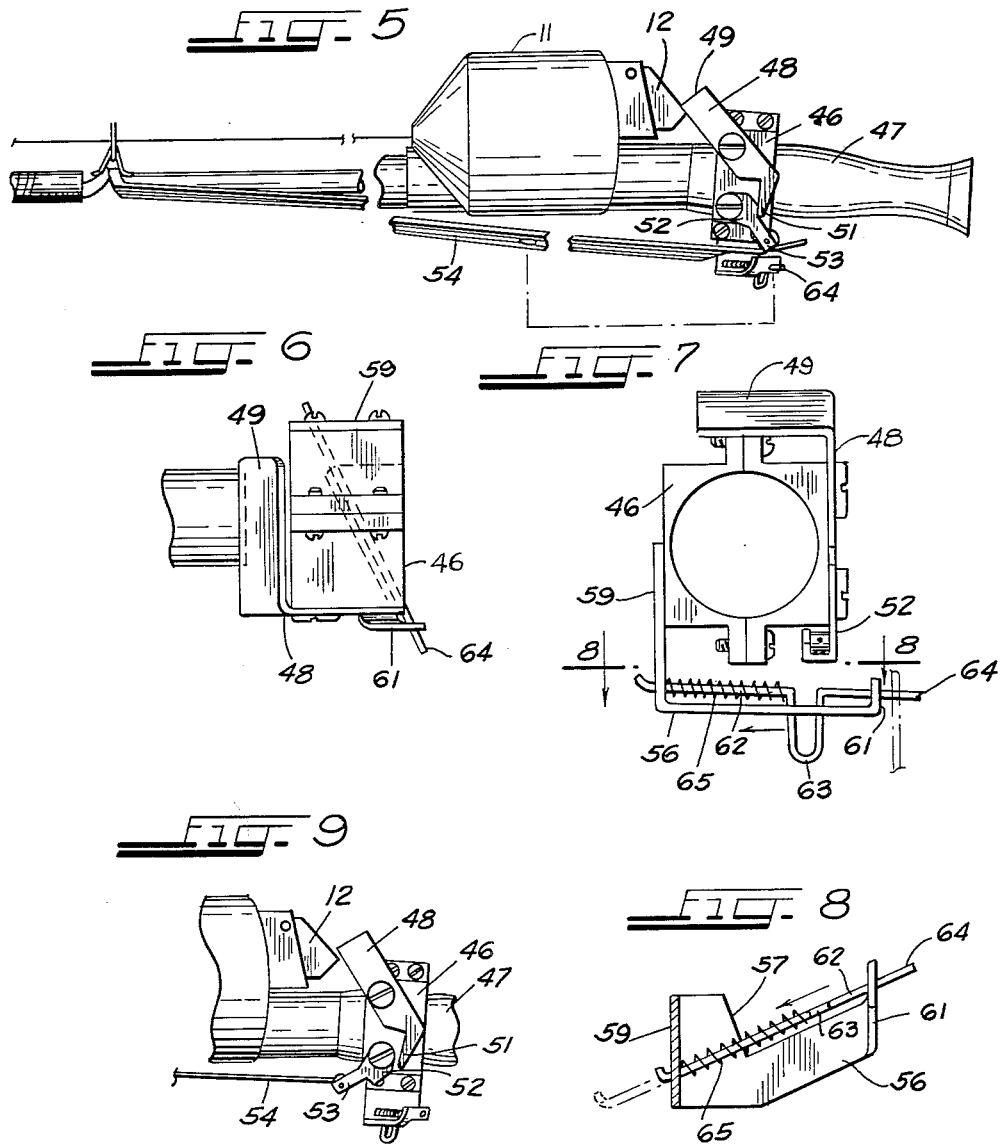

United States Patent Office 3,143,823
Patented Aug. 11, 1964

---

3,143,823
FISHING ROD AND REEL ATTACHMENT
Walter M. Brown, 275 Clearmont Drive, Elk Grove Village, Ill., and Sam Trombatore, 1716 N. Hudson Ave., and Bruno Brown, 5222 S. Ridgeway Ave., both of Chicago, Ill.
Filed May 16, 1962, Ser. No. 195,233
7 Claims. (Cl. 43—19)

This invention relates to attachments for fishing rods and reels.

According to conventional casting practice a fishing rod is swung from a rearward position in a forwardly direction, substantially in an overhead vertical arc, to project a lure or bait. When the tip of the rod in its travel reaches substantially the top of the arc, the fisherman releases the brake restraining the line to permit the line to peel off the spool of the reel, in order to effect projection of the lure or bait. A fairly high degree of skill is required on the part of the fisherman to effect release of the brake at the optimum time in order to obtain a desired travel of the lure or bait. Further, when fishing along the shore or river bank or in a sheltered area, a fisherman must always be extremely careful to avoid interference with low overhanging branches or other objects so as to avoid snagging of the line. This hampers his free movements and affects the accuracy of his cast. Similarly, when casting from a boat in which there may be other occupants, a fisherman must be careful to avoid injury to such other occupants who may be behind him when he causes the rod to be swung rearwardly preliminary to swinging the rod in a forward direction.

One of the objects of this invention is the provision of an attachment for a conventional rod and spin-cast reel which permits a lure or bait to be projected without swinging the rod, as in a conventional casting motion, thereby avoiding any likelihood of injuring others or any possible interference with any overhanging object.

Another object of this invention is the provision of an attachment of the foregoing character which cooperates with the line braking control means of the reel and also affords means by which the fishing rod may be bowed under desired tension so that when tension on the rod is released, as by a trigger-like arrangement, the rod in rebounding is caused to project a lure forwardly, the attachment also incorporating means to release the brake at the optimum point of rebound of the rod to obtain a maximum effect from the casting action.

A further object of this invention is the provision of attachment means of the foregoing character which is simple in construction, efficient in operation and economical to manufacture.

Other and further objects and advantages of this invention will become apparent from the following description when the same is considered in connection with the accompanying drawings in which, FIG. 1 is a side elevational view of a conventional spin-cast fishing reel and rod with a preferred embodiment of our invention applied thereto;

FIG. 2 is a perspective view of our invention and showing the components thereof in exploded relation;

FIG. 3 is a side elevational view of the operating mechanism of our invention with the parts in different operating positions from those shown in FIG. 2;

FIG. 4 is a top plan view of the device shown in FIG. 3;

FIG. 5 is a side elevational view of a modified embodiment of our invention and showing the same applied to a conventional spin-cast fishing reel and rod;

FIG. 6 is a top plan view, on an enlarged scale, of the operating mechanism of our invention illustrated in FIG. 5;

FIG. 7 is a front elevational view thereof;

FIG. 8 is a cross-sectional view taken substantially on line 8—8 of FIG. 7; and

FIG. 9 is a side elevational view, similar to FIG. 5, but showing the parts in a different position of operation.

Referring to the drawings, and particularly to FIGS. 1 to 4, inclusive, wherein is shown a preferred embodiment of our invention, the numeral 10 indicates a conventional casting rod which may be formed of any suitable material such as bamboo, metal or fiber glass and which preferably has a relatively high degree of resiliency so that it may be bowed. Carried on the rod 10 is a conventional spin-cast reel, indicated generally by the numeral 11, provided with the usual thumbing member 12. In a conventional casting action of the reel and rod, the thumbing member 12 is held in depressed condition by the fisherman to brake the line against peeling off from itis spool and at the proper moment, in the movement of the fishing rod in its arc, the thumbing member 12 is released and the line is permitted to play out whereby the lure or bait may be projected to a desired point. A conventional spin-cast reel of the type herein referred to is exemplified in Patent No. 2,862,679, issued December 2, 1958.

In accordance with our invention, we provide an attachment indicated generally by the numeral 13 mounted on the handle portion 14 of the fishing rod immediately rearwardly of the reel 11, the attachment having an element engageable with the thumbing member to control the same. The attachment 13 of our invention includes a substantially tubular clamping body 15 which may be slipped endwise on the handle 14 of a conventional rod and suitably clamped thereon in a fixed position. The top of the clamping body 15 is generally flat and suitably spot-welded thereon is a substantially inverted L-shaped member 17, the horizontal leg 17a of which terminates in a reversely bent portion providing an overhanging flange 18. A pair of lugs 19 are struck from the opposite edge of the horizontal leg portion and are reversely bent in opposing relation to the flange 18. The lugs 19 and flange 18 afford retaining means for a slide member 21 hereinafter to be described. The vertical leg 22 of member 17 extends downwardly and pivotally mounted on said leg is a latching member 23 provided with a generally horizontally bent finger 24 and a vertical leg portion 26 which is bent angularly outwardly and terminates in an acorn portion 27. As will be apparent by reference to FIGS. 2 and 3, the horizontal portion of the latching member 23 is disposed a slight distance above the horizontal leg 17a and a torsion spring 28 serves to bias the latching member in a direction so that the end normally engages against the horizontal leg 17a. A trigger element 29 is pivotally mounted on the vertical leg 22 and has a finger engaging portion which extends rearwardly beyond the vertical leg 22 and alongside the handle portion of the rod 10. The opposite end of the trigger is provided with a hook element 31 which cooperates with a sear element 32 also pivotally mounted on the vertical leg 22. The sear element 32 is generally U-shaped and includes two legs 33 and 34. Leg 33 cooperates with the hook element 31 while the other leg 34 affords a finger for engaging in the eyelet of a tension tape 36, hereinafter to be described. A lug 37 is struck out from the lower portion of the leg 22 and bent at a right angle to the plane of the leg to afford a stop to limit the movement of the sear element 32 in a counterclockwise direction, as viewed in FIG. 3. A torsion spring 38 is mounted on the vertical leg 22 and its terminal ends are arranged to engage respectively against the edges of the sear element 32 and trigger element 29, in the manner illustrated. It will be seen that the spring 38 biases the trigger element 29 in a clockwise direction and the sear element 32 in a counterclockwise direction, as viewed in FIG. 3. Accordingly, under normal non-operative conditions the sear element 32 and trigger element 29 assume the relationship illustrated in FIG. 2.

The slide member 21 is generally U-shaped and includes a base portion which is confined between the flange 18 and lug 19 for sliding movement. The base portion is provided along the one edge with an angular cut-out 39 which affords an abutment to be engaged by the finger 24, as will be seen clearly in FIGS. 2 and 4. Such engagement, of course, prevents movement of the slide 21 to the right, as viewed in FIG. 4. Integral with the base of the slide member 21 are a forward vertical leg 41 of substantial height and a rearward vertical leg 42 of lesser height. As will be seen clearly in FIG. 3, the forward leg 41 is intended to engage against the thumbing member 12 when the device is mounted on the handle portion of a fishing rod.

Referring to FIGS. 1 and 2, there is attached to the rod 10, intermediate its length, one end of a tape 36 or other suitable flexible cord or the like. A tape is preferred, since it may be provided with a series of eyelets 42 disposed at spaced intervals along a major portion of the tape. If a cord is used suitable loops or apertures must be provided at spaced intervals lengthwise of the cord. The tape 36 preferably has a length such that when the rod 10 is in straight normally relaxed condition and with the free end of the tape hooked through an eyelet 42 onto the acorn portion 27 of the latching element, the tape is in slightly taut condition, that is, without any slack. In order to condition the rod for casting, the fisherman applies tension to the tape 36 in order to bow the rod, in the manner illustrated in FIG. 1, and hooks the finger 34 of the sear element through one of the eyelets 36. It will be understood that the degree to which the rod is bowed will determine the distance to which the lure or bait is projected, and accordingly, the fisherman may selectively bow the rod to a greater or less degree and retain the rod in such bowed condition by engaging the finger 34 in an appropriate eyelet 36 on the tape. It will also be understood that prior to bowing of the rod, the slide member 21 is locked in its foremost position to press against the thumbing member 12, by engagement of the finger 24 with the abutment 39 in the slide member. In this position the braking means of the reel is effective to prevent play-out of the line. In order to project the lure or bait, the fisherman merely holds the rod stationary in front of him and by manipulating the trigger element 29 effects disengagement of the hook portion 31 with leg 33 of the sear element. This permits the tension of the bowed rod to overcome the pressure of the torsion spring 38, whereby the sear element 32 is caused to rock in a clockwise direction to the momentary position of FIG. 3 to effect an instantaneous release of the tape 36, whereby the rod is caused to spring back to its normal condition. In doing so, at the optimum moment of rebound, the tape 36 will become taut and will rock the latch member 23 in a clockwise direction, as viewed in FIG. 3, effecting a lifting of the finger 24 and disengagement of the same with the abutment 39, permitting the thumbing member 12 to return to non-braking position, thereby releasing the line so that the whip of the rod will cause the lure or bait to be projected forwardly. Retrieving of the line, of course, is accomplished in the usual conventional manner. In order to condition the attachment for a succeeding cast, the trigger element 29 is rocked upwardly to permit the sear element 32 to return to the normal position illustrated in FIG. 2. In this position the hook portion 31 of the trigger element is in engagement with the leg 33 to lock the sear element 32 against movement. Correspondingly, the slide element 21 is moved to the left, as viewed in FIG. 3, so as to effect engagement of the finger 24 against the abutment 39 of the slide element and thereby to lock the thumbing element 12 in braking position.

In the modified embodiment illustrated in FIGS. 5 through 9, the attachment comprises a body portion 46 formed of two separable elements arranged to be clamped onto the handle portion 47 of a fishing rod. A lever member 48, having a transverse arm 49 is pivotally mounted on one side of the body portion 46 with the arm 49 in engagement with the thumbing member 12 of a spin cast reel. The opposite arm of the lever terminates in a finger 51, shaped substantially as illustrated. Spaced below the pivotal mounting of the lever 48 is a cam lock element 52 which is pivotally mounted and which includes a camming surface arranged to be engaged by the finger 51, in the manner illustrated in FIG. 5. The cam lock element 52 includes an arm 53 extension provided with means at the terminal end thereof for securing a tape or cord 54, similar to that hereinbefore described. Depending from the body portion 46 is a substantially L-shaped bracket 56, the transverse portion of which is provided with a cut-out 57, as illustrated in FIG. 8. The vertical legs 59 and 61 of the bracket are pierced to receive a slide member 62 provided with an intermediate finger engaging portion. A coil spring 65 normally biases the finger engaging portion 63 to the right, as viewed in FIG. 7, so that one end of the slide member 62 normally projects beyond the leg 61 and affords a finger 64 for engagement in an eyelet in the tape 54. It will be apparent that the slide member 62 is moveable lengthwise, the limit of movement to the left, as viewed in FIG. 8, being determined by the abutment of the finger engaging portion 63 against the edge of the cut-out 57.

In operation, with the free end of the tape attached to the arm 53, an appropriate eyelet of the tape is hooked onto the finger 64 to effect a desired bowing of the rod. The rod thus is positively secured in a bowed condition by the tape which is in a condition of tension between the finger 64 and the point of securement of the tape to the rod. It will be understood that the portion of the tape 54, rearwardly of the point of attachment to the finger 64 is in relaxed or loose condition and, accordingly, the cam lock 52 may be rocked to assume the position illustrated in FIG. 5, with the finger 51 of the lever 48 in engagement with the camming surface of the cam lock 52. It will be apparent that in this position the arm 49 is in engagement with the thumbing member 12 maintaining the same in depressed condition and thereby effecting a braking on the line, so that it cannot peel off the spool of the reel. So long as no tension is applied to the cam lock 52 the braking effect on the line will be maintained.

In order to effect a casting of the lure or bait, the fisherman while holding the rod in front of him engages the finger portion 63 of the slide member to move the same to the left, as viewed in FIG. 7, to fully retract the finger 64. At this point the tape 54 is released, permitting the rod to swing back to normal position, and at the optimum point where the slack in the tape is taken up, the cam lock 52 is caused to assume the position illustrated in FIG. 9, releasing the lever 48 and correspondingly disengaging arm 49 from the thumbing piece 12, thereby releasing the brake on the line and permitting the line to play out in the course of projection of the lure or bait.

It will be understood that in both the preferred and modified embodiments the leg 41 and arm 49 are respectively of sufficient height and length so as to accommodate the attachment to a variety of different types of spin cast reels and accordingly, affording a high degree of versatility and adaptability to a large variety of reels.

Various changes coming within the spirit of our invention may suggest themselves to those skilled in the art; hence, we do not wish to be limited to the specific embodiments shown and described or uses mentioned, but intend the same to be merely exemplary, the scope of our invention being limited only by the appended claims.

We claim:

1. In combination with a resilient fishing rod having a handle portion and a spin cast reel having a line and a line-braking control member adapted to be actuated, (a) a flexible cord attached at one end to said rod intermediate the length thereof, (b) an attachment mounted on the handle portion of said rod for actuating said control member to effect release or braking of said line, (c) said attachment including moveable means engageable with said control member for holding said control member actuated to prevent release of said line, (d) releasable means for locking said moveable means in engagement with said control member, (e) said cord being attached to said releasable means, (f) means for releasably securing said cord at a point intermediate its ends after the cord has been tensioned by the operator to bow said rod, (g) means for releasing said securing means to permit said rod to swing back from its bowed to its normal position, (h) the movement of said rod applying tension on said cord to effect release of said moveable means and release of said control member to permit the line to pay out from said reel.

2. In combination with a resilient fishing rod having a handle portion and a spin cast reel having a line and a line-braking control member adapted to be actuated, (a) a flexible cord attached at one end to said rod intermediate the length thereof, (b) an attachment mounted on the handle portion of said rod for actuating said control member to effect release or braking of said line, (c) said attachment including a slide member having one end thereof arranged to abut said control member and to releasably hold said control member actuated to prevent release of said line, (d) a latch element for releasably locking said slide member in abutment with said control member, (e) the other end of said cord being attached to said latch element, (f) means for releasably securing said cord at a point intermediate its ends after the cord has been tensioned by the operator to bow said rod, (g) trigger actuated means for releasing said securing means to permit said rod to spring back from its bowed to its normal position, (h) the movement of said rod applying tension on said cord to effect release of said slide and release of said control member to permit the line to pay out from said reel.

3. The invention as defined in claim 1 in which the cord comprises a tape having a series of spaced apertures, any one of which is engageable by said securing means for varying the degree of bow in said rod.

4. In combination with a resilient fishing rod having a handle portion and a spin cast reel having a line and a line-braking control member adapted to be actuated, (a) a flexible cord attached at one end to said rod intermediate the length thereof, (b) an attachment mounted on the handle portion of said rod for actuating said control member to effect release or braking of said line, (c) said attachment including moveable means engageable with said control member for holding said control member actuated to prevent release of said line, (d) releasable means for locking said moveable means in engagement with said control member, (e) the other end of said cord being attached to said releasable means, (f) means for releasably securing said cord at one of a plurality of places intermediate its ends after the cord has been tensioned by the operator to bow said rod, (g) means for releasing said securing means to permit said rod to spring back from its bowed to its normal position, (h) the movement of said rod applying tension on said cord to effect release of said moveable means and release of said control member to permit the line to pay out from said reel.

5. In combination with a resilient fishing rod having a handle portion and a spin cast reel having a line and a line-braking control adapted to be actuated, (a) a flexible tape having a series of spaced apertures and attached at one end to said rod intermediate the length thereof, (b) an attachment mounted on the handle portion of said rod for actuating said control member to effect release or braking of said line, (c) said attachment including a body portion arranged to be clamped on said handle portion, (d) a slide member supported on said body portion and having one end thereof arranged to abut said control member and to releasably hold said control member actuated to prevent release of said line, (e) a pivoted latch element for releasably locking said slide member in abutment with said control member, (f) the other end of said cord being attached to said latch element, (g) a sear element pivoted on said body portion and including a hook element engageable in one aperture in said tape, (h) trigger actuated means carried on said body portion and cooperating with said sear element to effect disengagement of said hook element with said cord.

6. In combination with a resilient fishing rod having a handle portion and a spin cast reel having a line and a line-braking control member adapted to be actuated, (a) a flexible cord attached at one end to said rod intermediate the length thereof, (b) an attachment mounted on the handle portion of said rod for actuating said control member to effect release or braking of said line, (c) said attachment including a body portion arranged to be clamped on said handle portion, (d) a lever pivoted intermediate its ends on said body portion and having one end thereof arranged to abut said control member and to releasably hold said control member actuated to prevent release of said line, (e) a releasable camlock pivoted on said body portion and cooperating with the other end of said lever to lock said lever in abutment with said control member, (f) the other end of said cord being attached to said cam lock, (g) means for releasably securing said cord at a point intermediate its ends after the cord has been tensioned by the operator to bow said rod, (h) means for releasing said securing means to permit said rod to spring back from its bowed to its normal position, (i) the movement of said rod applying tension on said cord to effect release of said lever and release of said control member to permit the line to pay out from said reel.

7. In combination with a resilient fishing rod having a handle portion and a spin cast reel having a line and a line-braking control member adapted to be actuated, (a) a flexible cord attached at one end to said rod intermediate the length, (b) an attachment mounted on the handle portion of said rod for actuating said control member to effect release or braking of said line, (c) said attachment including a body portion arranged to be clamped on said handle portion, (d) a lever pivoted intermediate its ends on said body portion and having one end thereof arranged to abut said control member and to releasably hold said control member actuated to prevent release of said line, (e) a releasable cam lock pivoted on said body portion and cooperating with the other end of said lever to lock said lever in abutment with said control member, (f) a slideable pin having an end engageable in an aperture in said cord and operable to releasably secure said cord at a point intermediate its ends after the cord has been tensioned by the operator to bow said rod, (g) means for effecting disengagement of said pin from said cord to permit said rod to spring back from its bowed to its normal position, (h) the movement of said rod applying tension on said cord to effect release of said lever and release of said control member to permit the line to pay out from said reel.

References Cited in the file of this patent

UNITED STATES PATENTS

| | | |
|---|---|---|
| 2,381,089 | Tweit | Aug. 7, 1945 |
| 2,593,885 | James | Apr. 22, 1952 |
| 2,933,845 | Millet | Apr. 26, 1960 |